(12) United States Patent
Cofran (10) Patent No.: US 9,233,297 B2
(45) Date of Patent: Jan. 12, 2016

(54) INFIELD SET UP DEVICE

(71) Applicant: Forrest Lohiau Cofran, Kailua, HI (US)

(72) Inventor: Forrest Lohiau Cofran, Kailua, HI (US)

(*) Notice: Subject to any disclaimer, the term of this patent is extended or adjusted under 35 U.S.C. 154(b) by 185 days.

(21) Appl. No.: 14/157,522

(22) Filed: Jan. 17, 2014

(65) Prior Publication Data

US 2015/0107124 A1   Apr. 23, 2015

Related U.S. Application Data

(60) Provisional application No. 61/891,904, filed on Oct. 17, 2013.

(51) Int. Cl.
*A63C 19/08* (2006.01)
*G01B 5/00* (2006.01)

(52) U.S. Cl.
CPC .............. *A63C 19/08* (2013.01); *G01B 5/0023* (2013.01)

(58) Field of Classification Search
CPC ......... A63C 19/08; G01B 5/0023; G01B 5/25
USPC ....... 33/1 G, 1 H, 1 LE, 1 CC, 759, 709, 563, 33/562, 566
See application file for complete search history.

(56) References Cited

U.S. PATENT DOCUMENTS

| | | |
|---|---|---|
| 3,514,863 A | 6/1970 | Moll |
| 3,668,781 A | 6/1972 | Teter |
| 4,160,324 A * | 7/1979 | Dunn ..................... A63C 19/06 33/759 |
| 4,267,637 A | 5/1981 | Paull |
| 5,107,595 A * | 4/1992 | Stay .................... E04G 21/1833 33/1 G |
| 5,371,949 A | 12/1994 | Delaurier |
| 6,893,365 B2 | 5/2005 | Rathbun |
| 7,887,443 B2 | 2/2011 | Bryant |
| 7,909,712 B2 | 3/2011 | Boyles |
| 7,984,562 B2 * | 7/2011 | Redmond ............. A63C 19/08 33/1 G |
| 2006/0010705 A1 | 1/2006 | Dettellis |
| 2015/0107124 A1 * | 4/2015 | Cofran ................... A63C 19/08 33/32.3 |

* cited by examiner

*Primary Examiner* — Yaritza Guadalupe-McCall
(74) *Attorney, Agent, or Firm* — Steven Gray (57) ABSTRACT

A device and a method for accurately laying out the bases of an infield, said device comprising marking pieces that attach to one another to form a single integrated unit. Base marking pieces forming the integrated unit may mark the positions of the bases of an infield. The marking pieces may be connected, which connecting means may assist in measuring distances between marking pieces, which measured distances may determine proper positions of the base marking pieces. After bases are laid out and an infield set up, the marking pieces may re-attach to again form the integrated unit.

In one embodiment, accuracy may be increased by utilizing a center reference point marked by a center marking piece. The center marking piece may be connected to some base marking pieces, and in one embodiment the base marking pieces may attach to the center marking piece and together form the integrated unit.

20 Claims, 5 Drawing Sheets fig.1 fig.2

INFIELD SET UP DEVICE

BACKGROUND

Baseball is played on a field comprised of an outfield and an infield, with most of the action taking place on the infield. The infield is in the shape of a diamond, with first base, second base, third base, and home plate located in sequence at each point of the diamond. A player must progress counter-clockwise from base to base to score a run. The team with the most runs at the end of the game wins. There is an equal distance between each adjacent base, but this distance varies depending on baseball league. For major league and most male adult baseball leagues, distance between adjacent bases is 90 feet. For "little league," the distance between adjacent bases may be about 60 feet, with some other leagues also having varying sizes between 60-90 feet between adjacent bases.

Although baseball is a favorite pastime of many people, baseball's popularity combined with a finite number of permanent baseball fields can result in an unmet demand for full-sized baseball fields, where, for example, two or more baseball teams may have to share one baseball field for practice purposes. An insufficient number of fields may, among other negative results, limit practice time and thereby inhibit team progress and player development. To try and ameliorate this problem, when a playing surface exists with sufficient open space, coaches and/or players may set up makeshift infields using items on hand such as branches, coats, etc., as bases, or may use a portable set of bases. The accuracy of the layout of such infields, however, often depends to a large degree on fallible human judgment. The resulting inaccurate and imprecise measurements of such makeshift diamonds can lead to team practices that fail to sufficiently replicate real-game conditions, thus negatively impacting the judgments and expectations of players, and also lead to poor playing habits.

To attempt to achieve greater accuracy of base positions, some coaches, parents, and/or players may use string or tape to measure out the distance to each base one at a time—an often time-consuming process. Moreover, such string may become entangled with itself, other objects, and even players, as the string in some cases remains on the playing surface during play. In addition, such string must be removed from the playing surface by manual means, such as winding up the string on a reel by hand, which can be burdensome. Furthermore, some prior art devices attempting to set up an infield using strings or measuring tapes, whether requiring hand-reeling or not, may require substantial concentration and time. In addition some such devices may require the purchase of a "measuring ball base," if not a whole new set of bases.

Thus there exists a need for an infield measuring and aligning device that may function quickly, conveniently, and accurately, thereby maximizing quality practice time for players and for coaches.

SUMMARY

A conveniently portable device for measuring and aligning the bases of an infield quickly and accurately. Although the device may allow measuring of distances to all bases simultaneously, it may nevertheless be in the form of a single, integrated unit that is portable and operable by a single person. In one embodiment, the device may be comprised of at least four marking pieces, four of which may be base marking pieces for marking the respective positions of the home plate, first base, second base, and third base of an infield, which marking pieces may attach to at least one other marking piece so that together they form the integrated unit. For example, irrespective of the shape of the base marking pieces (whether square-shaped or other), the positions of the base marking pieces may be radially arranged while in the form of the integrated unit (and in one embodiment, with at least a part of each base marking piece forming an outer part of the integrated unit), with each base marking piece oppositely-positioned from another base marking piece and adjacent to two other base marking pieces. More specifically, for example in one embodiment the second base marking piece may be positioned opposite from the home base marking piece, and adjacent to the first base marking piece and the third base marking piece, and with similar positional relationships between the other base marking pieces (e.g., the first base marking piece may be positioned opposite from the third base marking piece and adjacent to the home base marking piece and the second base marking piece).

One embodiment of the device may improve accuracy further by measuring distances to at least some of the base marking pieces from a central reference point, located in about the center of the infield diamond. Thus, in addition to utilizing base marking pieces, the device marking pieces may comprise a center marking piece for marking the position of the central reference point. In one embodiment, each base marking piece may attach to the center marking piece. For example, in one embodiment, the second base marking piece may be located on the side of the center marking piece opposite from the home base marking piece, and adjacent to the first base marking piece and the third base marking piece. The marking pieces may all be secured to the playing surface by, in one embodiment, apertures in each marking piece through which a stake may be inserted to secure a marking piece to a surface.

In one embodiment, the marking pieces, even when detached from any marking piece, may nevertheless be connected to at least one other marking piece by some connecting means such as, for example, a cord (e.g., nylon bands in one embodiment). Moreover said connecting means may be extensible and retractable by, for example, coils around which the cords may be reeled. One embodiment of the device, the connecting means may extend from one base marking piece to an oppositely-situated base marking piece, or from a base marking piece to an adjacent base marking piece, or from at least a base marking piece to a center marking piece (depending on the particular embodiment), in order to more accurately gauge the positions and alignments of all the bases together. In one embodiment incorporating cords, the total unwindable, extensible lengths of the cords may be the substantially correct distances for properly laying out the bases of the diamond. In another embodiment, the cords may include markings indicating proper measurements for different sizes of an infield (e.g., major league baseball, softball, and/or little league, etc.). Once unwound, the cords may be re-wound, and this capability to retract fully may assist in the marking pieces quickly and conveniently re-attaching compactly together to form the easily portable single unit. Such a single unit may have various shapes according to embodiment but in one embodiment may be in the shape of a square, with each base marking pieces comprising a corner of the square.

One objective of the device and method is to facilitate laying out the bases of an infield accurately, quickly, and conveniently in several simple steps. Specifically, in one embodiment, a first step may be to separate one base marking piece until it lies a certain distance (i.e., a first distance) away from its oppositely-positioned base marking pieces for setting up the infield, which first distance corresponds to the correct distance between oppositely-situated or positioned bases of an infield so that bases may be accurately laid at the opposite end points of said first distance.

Next, the proper positions of the base marking pieces adjacent to the oppositely-positioned base marking pieces laid out, can be determined by measuring the correct distance between each base marking piece and its adjacent base marking pieces for setting up an infield (i.e., the second distance or base-to-adjacent base total length), the second distance being the correct distance between adjacent bases of an infield. For example, two second distances may be measured from the first-laid base marking piece to its two adjacent base marking pieces, and from the base marking piece oppositely-positioned from said first-laid out base marking piece to said piece's two adjacent base marking pieces—which adjacent base marking pieces for both of the oppositely-positioned bases are the same adjacent base marking pieces, one adjacent base marking piece on either side of the axis formed by the first-laid base marking piece and the oppositely situated base marking piece—by connecting said second distances so that the end points of each second distance separately extending from the first laid base marking piece to both adjacent pieces, and the end points of each second distance separately extending from the base marking piece oppositely-positioned from the first laid base marking piece to either adjacent base marking piece, touch. Once the proper positions for base marking positions have been determined and marked by, for example, accurately measuring the first distance(s) and second distances between base marking pieces, the bases of an infield may be placed in the positions indicated and the marking pieces may be reattached together to form the single unit device, and removed from the playing surface.

Other embodiments of the device may involve variations of the aforementioned process. For example, in one embodiment incorporating a center marking piece, and where each base marking piece may be attached and connected to the center marking piece, the additional steps of detaching each base marking piece from the center marking piece may be taken. For example, a step may still be to separate one (first laid) base marking piece from the rest of the central unit so that it lies a first distances from its oppositely-positioned piece, but in this particular embodiment this might be accomplished by separating (i.e., detaching) both the first laid and the oppositely-positioned base from the center marking piece so that they remain a first distance apart from one another, and each being separated from the center marking piece substantially half the first distance (i.e., the center-to-base total length). In one embodiment, this may include the additional steps of inserting stakes through apertures in the oppositely-positioned base marking pieces and securing them to the ground in the correct positions a first distance apart from one another. More specifically as an example, the piece for marking the position of home plate (i.e., the home plate or home base marking piece) might be separated from the center piece and secured to the ground. Then the base marking piece opposite from the home plate (or home base) marking piece or from the area where the home base marking piece was detached—i.e., in one embodiment, the second base marking piece—may also be detached from the center marking piece and moved a first distance from the home base marking piece and secured to the ground.

In one embodiment of the device incorporating unwindable nylon cord as the connecting means, which able to wrap or be reeled around coils housed within the marking pieces, the cord connecting one base marking piece to its oppositely-positioned base marking piece (for example, connecting the second base marking piece to the home base marking piece) may be unwound and extended to a first distance for correctly laying out an infield. In one particular embodiment also incorporating unwindable nylon cord as the connecting means but also comprising the center marking piece, separate unwindable reeled cords connecting one base marking piece to the center marking piece and said one base marking piece's oppositely-positioned base marking piece to the center marking piece may both be unwound and extended substantially half of the first distance, and then stakes may then be inserted through the apertures in the oppositely-positioned base marking pieces securing them to the ground, and then the center marking piece may also be secured to the ground using a stake (although the order of these steps may vary). In another embodiment where all four base marking pieces are connected to the center marking piece in a similar manner, the two other base marking pieces adjacent to the first detached oppositely-positioned bases may also be separated from the center marking piece, and the respective unwindable cords may unwound and extended the correct distance and the base marking pieces secured to the ground in a similar manner. In one embodiment, the cords may be comprised of nylon and may extend to the desired distance and retract due to spring coil mechanisms. In one embodiment, the position of the coil may lock (which may be accompanied in one embodiment by an audible click), preventing a coil from automatically retracting the nylon cord once the cord has extended to the desired distance.

In the embodiment incorporating a center marking piece, once the marking pieces have all been separated the proper distances and have been placed in the proper positions using both a central reference point and adjacent reference points, and the marking pieces secured to the ground (which in one embodiment may occur when each coil is in a locked position and the cords taut), each base (including home plate) may be placed in a proper position to set up an infield. More specifically, based on the position of the home base marking piece, the home plate may be placed (in one embodiment) underneath the home base marking piece. Similarly, a second base may be placed in its proper position based on the second plate making piece. Based on the positions of the first and third base marking pieces, the first and third bases respectively may then be placed in their proper positions. Each base may also be further accurately aligned with the dimensions of the infield, using in one embodiment adjacent outer marking piece cords.

The base marking pieces may then be removed from the infield playing surface. In one embodiment, this may be accomplished by removing each stake from the aperture of each base marking piece and then reattaching each piece to the center marking piece to form a single unit. The center marking piece (for embodiments incorporating such a feature) may also be removed from the playing surface by removing the stake from its aperture. In one embodiment, the reattaching process may be facilitated by spring coil mechanisms that cause the cords connecting the marking pieces to automatically retract without requiring manual winding.

The order of steps for setting up a temporary infield using the device may vary depending on embodiment and/or preference. For example, the order of marking pieces that are detached, or reattached, or secured to the ground first may of course vary. In addition, in one embodiment each base may be placed in its proper location after each base marking piece is or less than all base marking pieces are properly positioned (e.g., after each base marking piece is secured to the ground), rather than after all the base marking pieces have been properly positioned. Moreover, configurations and materials used for the various components of the device may vary. For example, specific positions of the reeled coils within the device may vary in different embodiments.

It is also anticipated that the device and different embodiments thereof may be used in different manners that will be apparent to those skilled in the art(s) to which the device pertains. For example, although the device may permit a single person to accurately set up a baseball diamond quickly and easily in several steps, several persons may also cooperate to use the device to set up a baseball diamond in a more expeditious manner. Thus, the capability of the base marking pieces to simultaneously mark the positions of the bases may be beneficial to some device users.

Various means and methods may be used to keep the marking pieces in a certain desired position of a playing surface (depending, for example, on whether the playing surface is an outdoor grassy area or different type of playing surface). However, in the embodiment incorporating pointed objects to be inserted through apertures to secure the marking pieces to an outdoor ground playing surface, such securing means may vary. For example, the size of the stakes (and the apertures) may vary, but might in some embodiments have a width ranging from ¼" to ⅜".

Size and dimensions of the device and of marking pieces may also of course vary. In one embodiment the single unit may be relatively lightweight, portable by one person, relatively compact, and its outer surface may be comprised of durable material. In addition, in one embodiment, the cords connecting each base marking piece to adjacent base marking pieces may be beneficial for accurate alignment purposes. For example and not by way of limitation, in one embodiment the cords connecting adjacent bases may be used as a reference point for spraying base running lines on the infield playing surface.

The above description and listed alternative embodiments are considered that of some embodiments only. It is understood that the embodiments shown in the drawings and described above are merely for illustrative purposes and not intended to limit scope. Alterations and modifications of the device described herein, and such further applications of the principles said device, are contemplated as would occur to those skilled in the art(s) to which the device pertains.

DETAILED DESCRIPTION

"Cord" is herein defined as any flexible length material that may be wrapped on a spool or reel and that may be used for measuring distance. "Coil" is defined as an object such as a reel around which a cord may wind or be gathered, possibly in concentric rings or spirals. "Stake" is defined as an object that may secure a locating piece to a surface such as the ground. "Base" is defined as a base of any type of infield (e.g., baseball, softball, etc.), and any infield size, and may include home plate. "Separate" is broadly defined as substantially separate, and includes when pieces are detached yet still connected by for example, a connecting means. For example, a marking piece might be attached to another marking piece by a connecting means so that some surfaces of the marking pieces are contiguous, yet the marking piece might also become separate from the other marking piece so that no surfaces of the marking pieces are contiguous yet still the marking pieces may be connected by the connecting means.

Figure 1:
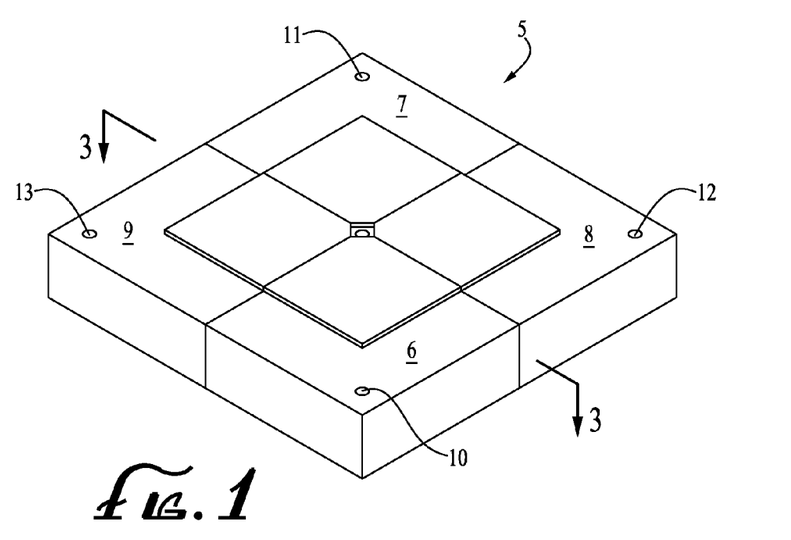
FIG. 1 is an overheard perspective view of a device for setting up an infield, the device being in the form as an integrated unit.

Turning to the drawings, FIG. 1 illustrates an embodiment of a device 5 for laying out an infield 54 (FIG. 4E), which embodiment 5 may be in the form of an integrated unit and, in the particular embodiment described herein, may be in the shape of a square. The square-shaped single-unit embodiment of the device 5 may have four base marking pieces 6, 7, 8, 9 located in each corner of the square: a piece for marking the position of home base 6, a piece for marking the position of second base 7, a piece for marking the position of first base 8, and a piece for marking the position of third base 9. The base marking pieces 6, 7, 8, 9 may be configured to attach together as a single, integrated unit 5, and to separate from one another, and to reattach together to form the integrated unit 5. Each piece for marking a base/plate may have an aperture 10, 11, 12, 13—a home base marking piece aperture 10, a second base marking piece aperture 11, a first base marking piece aperture 12, and a third base marking piece aperture 13. In the embodiment shown, each aperture 10, 11, 12, 13 may be located near the outer perimeter of the corresponding marking piece 6, 7, 8, 9.

Figure 2:
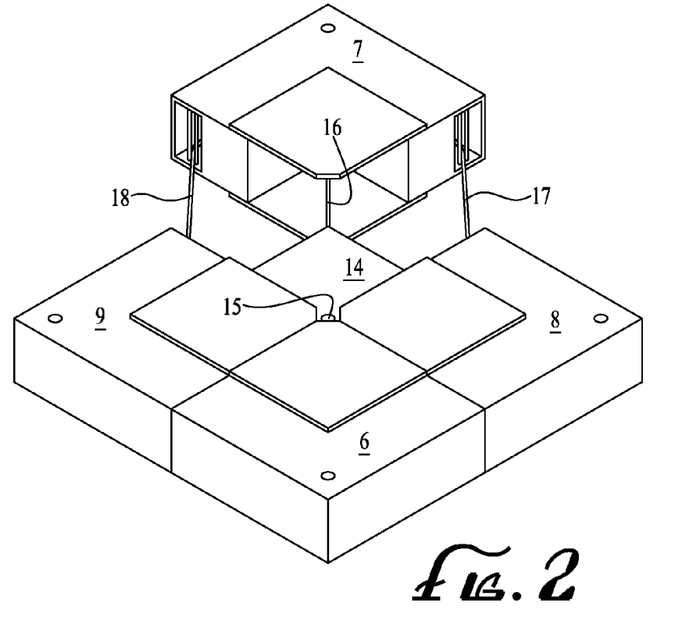
FIG. 2 is an overhead perspective view of the device in FIG. 1, with one base marking piece separated from the rest of the unit.

As shown in FIG. 2, in the center of the embodiment of the device 5 may be a piece for marking the center of the infield 14, and in the center of the center marking piece 14 may also be a center marking piece aperture 15. Each of the base marking pieces 6, 7, 8, 9 may separate from the rest of the device 5, and in the particular embodiment shown, may separate from the center marking piece 14. For example, as shown in FIG. 2, the second base marking piece 7 may separate from the center marking piece 14. However, even when separated from the center piece 14, the second base marking piece 7 may still be connected to the center piece 14 by means of a center piece cord 16 (a second base marking piece center cord 16). In addition, the second base marking piece 7 may also be connected to the adjacent corner marking pieces 8, 9 (in this case, i.e., the first base marking piece 8 and the third base marking piece 9) by means of adjacent marking piece cords 17, 18—one cord 17 running from the second base marking piece 7 to the first base marking piece 8 (a first-second adjacent cord 17), and another cord 18 running from the second base marking piece 7 to the third base marking piece 9 (a second-third adjacent cord 18).

Figure 3:
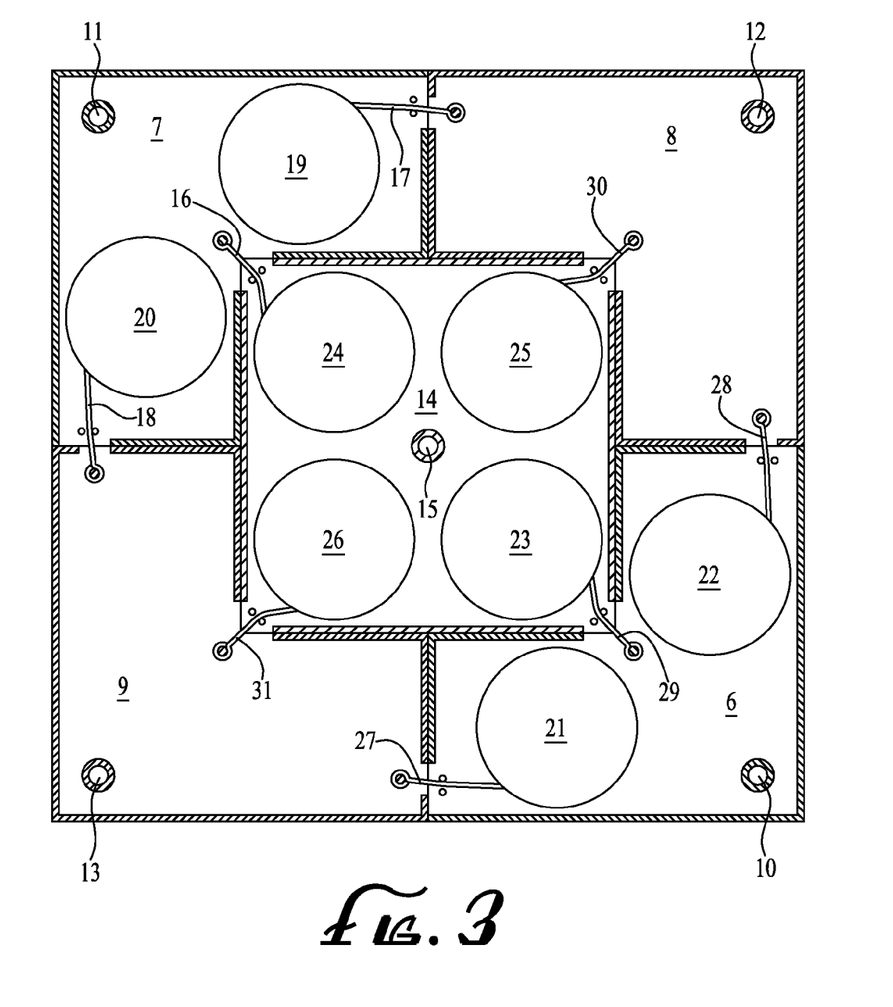
FIG. 3 is a cutaway overhead view of the device in FIG. 1.

Each cord connecting one marking piece to another marking piece may be retractable and extensible by means of coils. More specifically, as illustrated in FIG. 3, in the embodiment of the device shown, there may be spring coil mechanisms 23, 24, 25, 26 strategically placed to connect the center marking piece 14 to each base marking piece 6, 7, 8, 9 through respective center cords 29, 16, 30, 31. Similar spring coil mechanisms 19, 20, 21, 22 may allow each base marking piece 6, 7, 8, 9 to connect to an adjacent base marking piece 6, 7, 8, 9 via adjacent piece cords 17, 18, 27, 28, and allow said cords 17, 18, 27, 28 to retract or extend (by for example, the winding of the cords 17, 18, 27, 28 about the coils 19, 20, 21, 22 to be in a reeled position, and the unwinding of the cords 17, 18, 27, 28). In one embodiment of the device 5, there may be a setting where the cords 29, 16, 30, 31, 17, 18, 27, 28 retract automatically into the coils 23, 24, 25, 26, 19, 20, 21, 22 until/unless signaled to stop winding. The aforementioned features and components may assist the embodiment of the device 5 shown to set up an infield quickly and accurately, and in several relatively simple steps, as follows.

Figure 4A:
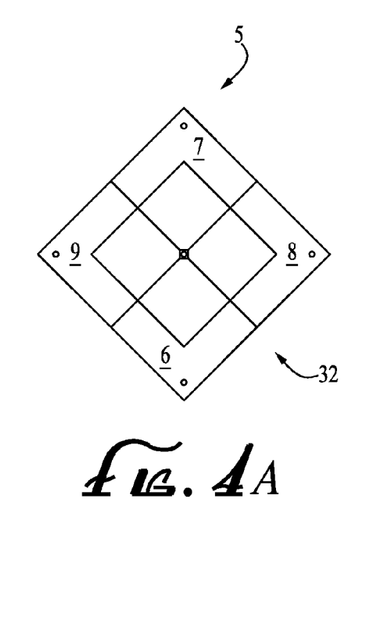
FIG. 4A is an overhead view of the device in FIG. 1, with marking pieces in the form as an integrated unit, demonstrating a first step of setting up an infield.
Figure 4B:
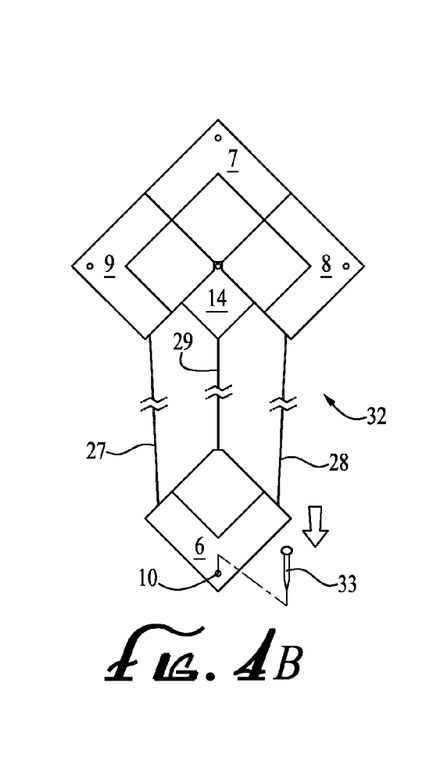
FIG. 4B is an overhead view of the device in FIG. 1, with a home base marking piece separated, demonstrating a second step of setting up an infield.

First, as shown in FIG. 4A, the embodiment of the device 5 may be easily portable in a compact single-unit configuration, with all of the base marking pieces 6, 7, 8, 9 attached together to form an integrated unit, and transported to an open playing surface 32 having sufficient size for a temporary infield. Second, as shown in FIG. 4B, the home base marking piece 6 may be separated from the center marking piece 14 (and the other marking pieces 7, 8, 9), and a stake 33 may be placed through the home base marking piece aperture 10, securing the home base marking piece 6 to the playing surface 32. The home base marking piece 6 may still be connected, however, to the center marking piece 14 through a center cord 29 (a home base marking piece center cord 29), and connected to the first base marking piece 8 via an adjacent piece cord 28 (a home-first adjacent cord 28), and connected to the third base marking piece 9 via another adjacent piece cord 27 (a home-third adjacent cord 27).

Figure 4C:
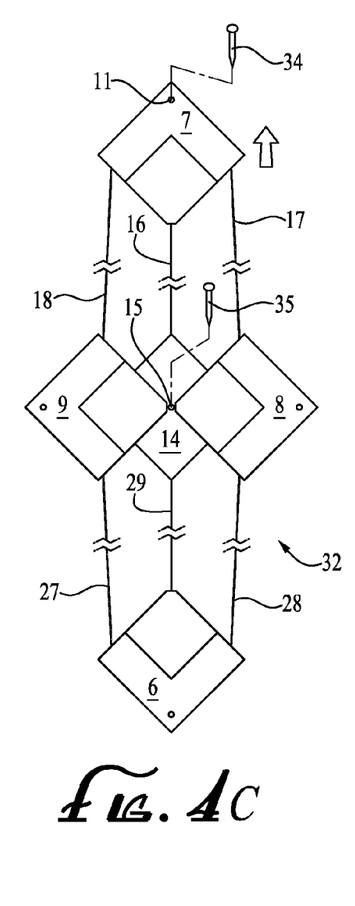
FIG. 4C is an overhead view of the device in FIG. 4B, with a second base marking piece separated, demonstrating a third step of setting up an infield.

Third, as shown in FIG. 4C, the second base marking piece 7, oppositely-positioned from the home base marking piece 6, may also be separated and pulled away from the center marking piece 14. The second base marking piece 7 may also still be connected to the center marking piece 14 through the second base marking piece center cord 16, and connected to the first base marking piece 8 via first-second adjacent piece cord 17, and connected to the third base marking piece 9 via second-third adjacent piece cord 18. Once the second base marking piece 7 has been extended a desired distance from the home plate piece 6 for accurately laying out an infield 54, which distance in one embodiment might be signaled by the second base marking piece center cord 16 being extended substantially to its full length, the spring coil mechanism 24 shown in FIG. 3 may (in one particular embodiment) enter a locked position, causing the cord 16 to no longer automatically retract. Similarly, the home base marking piece 6 may be located the desired distance from the center marking piece 14, which distance might be reached in one embodiment when the cord 29 connecting the home base marking piece 6 with the center marking piece 14 (which may also be referred to as the home base marking piece center cord 29) substantially reaches its full length, which in one particular embodiment may cause the spring coil mechanism 23 associated with the home base marking piece center cord 29 to lock, and causing that cord 29 to cease automatically retracting. In this configuration, the second base marking piece 7 and the oppositely-positioned home base marking piece 6 may be located a proper distance from each other for setting up an infield (referred to herein as a first distance). Another stake 34 may be placed through the second base marking piece aperture 11, thus securing the second base marking piece 7 to the playing surface 32. With the second base marking piece 7 extended the desired distance from the home base marking piece 6, and the home base marking piece center cord 29 and the second base marking piece center cord 16 both extended the desired distances (with might be for each half or substantially half of the first distance), the center marking piece 14 may also be secured to the playing surface 32, by placing another stake 35 through the center marking piece aperture 15.

Figure 4D:
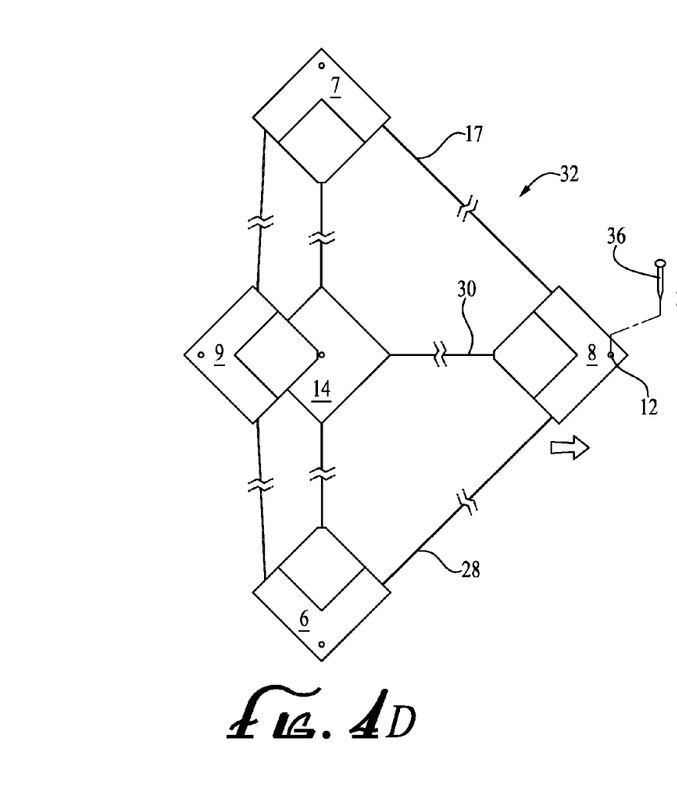
FIG. 4D is an overhead view of the device in FIG. 4C, with a first base marking piece separated, demonstrating a fourth step of setting up an infield.

Fourth, as shown in FIG. 4D, the first base marking piece 8 may be separated from the center marking piece 14 in a direction perpendicular to the direction in which the home base marking piece 6 and the second base marking piece 7 were extended. However, the first base marking piece 8 may still be connected to the center marking piece 14 via a first base marking piece center cord 30, to the home base marking piece 6 via an adjacent cord 28 (which may also be referred to as the home-first adjacent cord 28), and to the second base marking piece 7 via the first-second adjacent cord 17. Once the first base marking piece 8 is extended the desired distance away from the center marking piece 14, which might occur in one embodiment where the cord 30 connecting the first base marking piece 8 with the center marking piece 14 reaches its full length, the spring coil mechanism 25 (shown in FIG. 3) associated with the cord 30 connecting the first base marking piece 8 with the center marking piece 14 may in one embodiment cause that cord 30 to cease automatically retracting.

Similarly, once the first base marking piece 8 is extended away from the home base marking piece 6 and the second base marking piece 7 the desired distances, which might occur in one embodiment when the home-first adjacent cord 28 and the first-second adjacent cord 17 both reach their full lengths, the spring coil mechanisms 22, 19 (as shown in FIG. 3) associated with the home-first adjacent cord 28 and the first-second adjacent cord 17, respectively, may cause those cords 28, 17 to cease automatically retracting. With the first base marking piece 8 extended the desired distance from the center marking piece 14, and the desired distances from the home base marking piece 6 and the second base marking piece 7 (at which point, in one particular embodiment all the cords 30, 28, 17 connecting the first base marking piece 8 may be taut), the first base marking piece 8 may also be secured to the playing surface 32 by placing another stake 36 through the first base marking piece aperture 12.

Figure 4E:
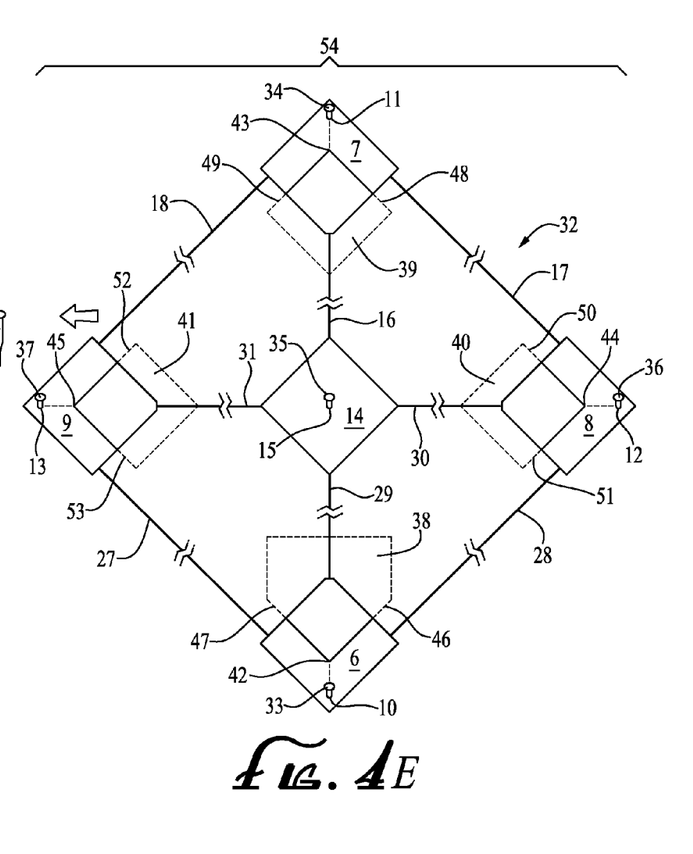
FIG. 4E is an overhead view of the device in FIG. 4D, with a third base locating piece in an extended position, demonstrating final steps of setting up an infield.

Fifth, as shown in FIG. 4E, the aforementioned basic process for extending and placing the first base marking piece 8 in the proper position may be repeated for the third base marking piece 9. Specifically, the third base marking piece 9 may be separated from the center marking piece 14 in a direction perpendicular to the direction in which the home base marking piece 6 and the second base marking piece 7 were extended, and in the opposite direction from the first base marking piece 8. As with the other base marking pieces 6, 7, 8, the third base marking piece 9 may still be connected to the center marking piece 14 via a third base marking piece center cord 31, and connected to the home base marking piece via an home-third adjacent cord 27, and to the second base marking piece via the second-third adjacent cord 18. The third base marking piece 9 may be extended away from the center marking piece 14 the desired distance, in one particular embodiment, where the third base marking piece center cord 31 reaches its full length, at which point the spring coil mechanism 26 (FIG. 3) associated with the third base marking piece center cord 31 may also cause that cord 31 to cease automatically retracting. In addition, once the third base marking piece 9 is extended away from both the home base marking piece 6 and the second base marking piece 7 the desired distances, which might occur in one particular embodiment when the home-third adjacent cord 27 and the second-third adjacent cord 18 reach their full lengths, the spring coil mechanisms 21, 20 (as shown in FIG. 3) associated with those cords 27, 18 may cause those cords 27, 18 to cease automatically retracting. (In one embodiment, this setting might be signaled to the user by an audible click.) With the third base marking piece 9 extended the desired distances from the center marking piece 14, the home base marking piece 6, and the second base marking piece 7 (at which point in one embodiment all the cords 31, 27, 18 connecting the third base marking piece 9 may be taut), the third base marking piece 9 may also be secured to the playing surface 32 by placing another stake 37 through the third base marking piece aperture 13.

Next, a set of bases 39, 40, 41, including a home plate 38, may be laid on the playing surface 32 to set up an infield 54. First, a home plate 38 may be positioned under the home base marking piece 6. In one embodiment, proper alignment of the home plate 38 may be achieved by positioning the base 38 so that the bottom corner 42 of the home plate 38 touches the stake 33 inserted within the home base marking piece aperture 10. Additional proper alignment of the home plate 38 may be achieved in one embodiment by positioning the bottom right edge 46 so that it is aligned with the home-first adjacent cord 28, and positioning the bottom left edge 47 so that it is aligned with the home-third adjacent cord 27.

Second, a second base 39 may be positioned under the second base marking piece 7, and accurate alignment may be achieved in one embodiment by positioning the second base 39 so that its top corner 43 touches the stake 34 in the second base marking piece aperture 11. Additional proper alignment of the second base 39 may be achieved in one embodiment by positioning the second base top right edge 48 so that it is aligned with the first-second adjacent cord 17, and positioning the second base top left edge 49 so that it is aligned with the second-third adjacent cord 18.

Third, a first base 40 may be positioned under the first base marking piece 8, and accurate alignment may be achieved in one embodiment by positioning the first base 40 so that its right corner 44 touches the stake 36 in the home base marking piece aperture 12. Additional proper alignment of the first base 40 may be achieved in one embodiment by positioning the first base top right edge 50 so that it is aligned with the first-second adjacent cord 17 (i.e., the cord running from the first base marking piece 8 to the second base marking piece 7), and positioning the first base bottom right edge 51 so that it is aligned with the home-first adjacent cord 28 (i.e., the cord running from the first base marking piece 8 to the home base marking piece 6).

Finally, a third base 41 may be positioned under the third base marking piece 9, with accurate alignment being achieved in one embodiment by positioning the third base 41 so that its left corner 45 touches the stake 37 in the home base marking piece aperture 13. Additional proper alignment of the third base 41 may be achieved in one embodiment by positioning the third base top left edge 52 so that it is aligned with the second-third adjacent cord 18 (i.e., the cord running from the third base marking piece 9 to the second base marking piece 7) and positioning the third base bottom left edge 53 so that it is aligned with the cord 27 running from the third base marking piece 9 to the home base marking piece 6.

With each of the bases 39, 40, 41 (including home plate 38) laid out on the playing surface 32, and properly aligned and in the proper positions to set up an infield 54, the device 5 may be removed from the playing surface 32 by removing each of the stakes 33, 34, 36, 37 from the playing surface 32 and respective apertures 10, 11, 12, 13, retracting each cord 17, 18, 27, 28, 29, 16, 30, 31 into each respective coil 19, 20, 21, 22, 23, 24, 25, 26, and reattaching each of the base marking pieces 6, 7, 8, 9 to the center marking piece 14 into the device 5 again, in the form of an easily portable single unit. In the embodiment described herein, this process may be accomplished without manual winding and without less likelihood that the cords 17, 18, 27, 28, 29, 16, 30, 31 will become entangled. In one particular embodiment, the coils 19, 20, 21, 22, 23, 24, 25, 26 may be reengaged to a setting of automatically retracting the cords 17, 18, 27, 28, 29, 16, 30, 31 by first attempting to extend the cords 17, 18, 27, 28, 29, 16, 30, 31 further outward. In such a manner, the bases 39, 40, 41 (including home plate 38) may be properly and precisely laid out and aligned to set up a temporary infield 54 on a playing surface 32.

Figures 4F, 4G:
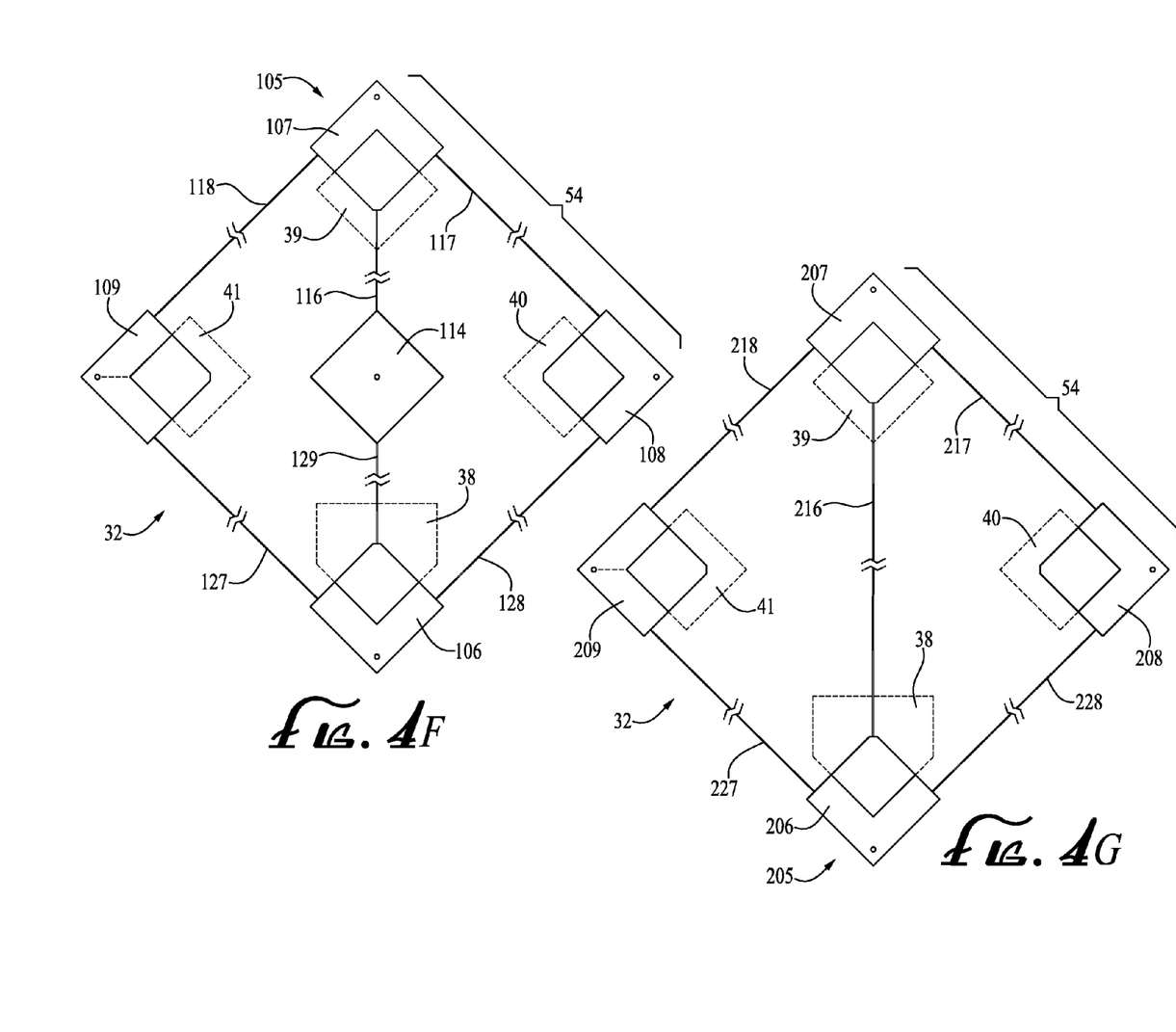
FIG. 4F is an overhead view of an embodiment of a device for setting up an infield that comprises a center marking piece connected to two oppositely-positioned base marking pieces.
FIG. 4G is an overhead view of an embodiment of a device for setting up an infield that comprises two connected oppositely-positioned base marking pieces, without a center marking piece.

FIG. 4F illustrates another embodiment a device, or alternative embodiment 105 for laying out an infield 54, which may also be in the form of an integrated unit. This square-shaped integrated-unit embodiment of a device 105 may also be comprised of a center marking piece 114 and four base marking pieces 106, 107, 108, 109: a piece for marking the position of home plate 106, a piece for marking the position of second base 107, a piece for marking the position of first base 108, and a piece for marking the position of third base 109. The alternative embodiment 105 may be used to accurately mark the positions of infield bases 38, 39, 40, 41 in much the same manner and steps as the embodiment of the device 5 described above, but one difference being that the alternative embodiment 105 may omit from its design cords and coils connecting the center marking piece 114 to one pair of oppositely-positioned bases such as (in the embodiment shown) the first base marking piece 108 and the third base marking piece 109. After the proper distance between the home base marking piece 106 and the oppositely-positioned second base marking piece 107 is determined by measuring the distance from the center marking piece 114 to the second base marking piece 107 using the center-second cord 116, and the distance from the center marking piece to the home base marking piece 106 using the center-home cord 129, the proper locations can be determined of the first base marking piece 108 and the third base marking piece 109, which lie adjacent to the oppositely-situated second base marking piece 107 and home base marking piece 106. The proper location of the first base marking piece 108 may be indicated by the home-first adjacent cord 128 and the first-second adjacent cord 117, and the proper location of the third base marking piece 109 may be determined by the home-third adjacent cord 127 and the second-third adjacent cord 118. As a variant for marking the positions of first base 40 and oppositely-positioned third base 41, the configurations of the first base marking piece 108 and the third base marking piece 109 (and related components) may be interchangeable with the home base marking piece 106 and the second base marking piece 107 (and related components) in other embodiments.

FIG. 4G illustrates another embodiment a device, or alternative embodiment 205 for laying out an infield 54, which may also be in the form of an integrated unit 205, but without a center marking piece 114, 14 (as shown in FIGS. 4E and 4F). This embodiment of a device 205 may also be comprised of at least four base marking pieces 206, 207, 208, 209: a piece for marking the position of home plate 206, a piece for marking the position of second base 207, a piece for marking the position of first base 208, and a piece for marking the position of third base 209. The embodiment 205 may be used to accurately mark the positions of infield bases 38, 39, 40, 41 in much the same manner and steps as the embodiment of the devices 5, 105 described above, with one difference being that the embodiment 205, instead of having two separate nylon cords 116, 129 (shown in FIG. 4F) extending from a center piece 114 to oppositely-situated base marking pieces 106, 107 to each measure more or less the half of the correct distance between the oppositely-situated bases 38, 39, the embodiment of a device 205 may instead have one length of flexible material 216 extending a first distance between oppositely-positioned home plate base marking pieces 206 and second base marking piece 207. After the proper distance between the oppositely-positioned home base marking piece 206 and the second base marking piece 207 is determined in this manner, and the home base marking piece 206 and the second base marking piece 207 are secured to the ground/playing surface 32, the proper locations can now be determined for the first base marking piece 208 and the third base marking piece 209, which may lie adjacent to the second base marking piece 207 and its oppositely-situated home base marking piece 206. As with the aforementioned embodiment of the devices 105 (FIG. 4F), the proper location of the first base marking piece 208 may be indicated by the home-first adjacent cord 228 and the first-second adjacent cord 217, and the proper location of the third base marking piece 209 may be determined by the home-third adjacent cord 227 and the second-third adjacent cord 218 (which may be extended a second distance). In an alternative embodiment, the positions of oppositely-positioned bases first base 40 and third base 41 may be marked first, by interchanging the configurations of the first base marking piece 208 and the third base marking piece 209 (and related components) with the home base marking piece 206 and the second base marking piece 207 (and related components).

I claim:

1. A device for setting up positions for first, second, third and home bases on an infield having a center point defining a center of the four bases, said device comprising:
an integrated unit comprising a center marking piece adapted to be positioned at the center point of the infield attachable to four base marking pieces adapted to define the positions of respective bases of the infield from the center point, each base marking piece being attached to the center marking piece by a first reeled cord that is unwindable to a predetermined center-to-base total length connecting between the base marking piece and the center marking piece to define the position of the respective base from the center point, and is rewindable to bring the base marking piece for reattachment to the center marking piece to form the integrated unit.

2. The device of claim 1, wherein each base marking piece comprising the integrated unit is oppositely-positioned from another base marking piece and adjacent to two adjacent base marking pieces, and wherein each base marking piece is connected to each adjacent base marking piece by a second reeled cord that is unwindable to a predetermined base-to-adjacent base total length connecting between each base marking piece and each adjacent base marking piece, and is rewindable to bring the base marking piece and the two adjacent base marking pieces together to form the integrated unit.

3. The device of the claim 2, wherein the first reeled cord attaching each base marking piece to the center marking piece is configured to unwind to the center-to-base total length, and the second reeled cord attaching each base marking piece to each adjacent base marking piece is configured to unwind to the base-to-adjacent base total length so that the base marking pieces mark the positions for the first, second, third and home bases on the infield.

4. The device of claim 3, wherein the first reeled cords connecting the base marking pieces to the center marking piece are configured to simultaneously be in unwound positions to the predetermined center-to-base total length, and the second reeled cords connecting each base marking piece to each adjacent base marking piece are configured to simultaneously be in unwound positions to the predetermined base-to-adjacent base total length; and wherein the second reeled cords connecting base marking pieces to adjacent base marking pieces are configured to be in unwound positions to the predetermined base-to-adjacent base total length at the same time that the first reeled cords connecting the base marking pieces to the center marking piece are in unwound positions to the predetermined center-to-base total length.

5. The device of claim 4, wherein the integrated unit is in the shape of a square, with each base marking piece forming a corner of the square.

6. A device for setting up positions for first, second, third and home bases on an infield, said device comprising:
an integrated unit comprising at least four marking pieces comprising four radially-arranged base marking pieces for marking the positions of the bases, each marking piece attachable to at least one other marking piece so that all the marking pieces together form the integrated unit, each base marking piece oppositely positioned from an oppositely-positioned base marking piece and adjacent to at least two adjacent base marking pieces, with each marking piece connected to at least one other marking piece, and each base marking piece connected to the at least two adjacent base marking pieces;
wherein, each base marking piece is separable from any marking piece to which it is attachable so that each base marking piece lies a first distance from the oppositely positioned base marking piece and a second distance from each adjacent base marking piece, so that the base marking pieces accurately mark the positions of the bases of the infield; and
wherein, the marking pieces are reattachable to the other marking pieces to form the integrated unit.

7. The device of claim 6, wherein at least one base marking piece is connected to its oppositely positioned base marking piece by a first connecting means for measuring the first distance; and each base marking piece is connected to each adjacent base marking piece by a second connecting means for measuring the second distance.

8. The device of claim 7, wherein the first connecting means is an unwindable reeled first length of cord, which length comprises the first distance; and wherein the second connecting means is an unwindable reeled second length of cord, which length comprises the second distance.

9. The device of claim 8, wherein each unwindable reeled first length of cord and each unwindable reeled second length of cord are configured to simultaneously be in unwound positions where each unwindable reeled first length of cord is extended the first distance and each unwindable reeled second length of cord is extended the second distance so that the base marking pieces are configured to simultaneously mark the positions of all the bases.

10. The device of claim 8, wherein the marking pieces further comprise a center marking piece for marking substantially the center point of the infield, the center marking piece configured to be positioned halfway between any base marking piece connected to its oppositely-positioned base marking piece and its connected oppositely-positioned base marking piece when any base marking piece connected to its oppositely-positioned base marking piece is separated from its oppositely-positioned base marking piece the first distance, and wherein the first connecting means connecting any base marking piece connected to its oppositely-positioned base marking piece comprises the center marking piece and two half connecting means, a first half connecting means, and a second half connecting means, each half connecting means for measuring substantially half of the first distance; each half connecting means comprising an unwindable reeled third length of cord the length of which comprises substantially half of the first distance; the first half connecting means and the second half connecting means connecting the center marking piece to any base marking piece connected to its oppositely-positioned base marking piece, and the oppositely-positioned base marking piece, respectively.

11. The device of claim 10, wherein each base marking piece attaches to the center marking piece to form the integrated unit.

12. The device of claim 11, wherein each base marking piece is connected to the center marking piece by a half connecting means comprising an unwindable reeled third length of cord the length of which comprises substantially half of the first distance.

13. A method for laying out the bases of an infield in their proper positions, each base having an oppositely-positioned base and two adjacent bases, there being in total two pairs of oppositely-positioned bases and four different combinations of pairs of adjacent bases, comprising a first of two pairs of adjacent bases and a second set of two pairs of adjacent bases, the distance between oppositely-positioned bases being a first distance having first distance end points at either end of the first distance, and the distance between each pair of adjacent bases being a second distance having second distance end points at either end of the second distance, the second distance end points comprising an oppositely-positioned base second distance end point and an adjacent base second distance end point, the method comprising the following steps:

measuring the first distance between one pair of oppositely-positioned bases, the measured first distance creating a line running between oppositely-positioned base positions, the line comprising an axis having two sides, a right axis side and a left axis side, and marking the base positions of the pair of oppositely-positioned bases at the first distance end points;

measuring the second distance between each of the four pairs of the adjacent bases, with the oppositely-positioned base second distance end points of the first set of two pairs of adjacent bases located at the measured base position of one oppositely-positioned base, and the oppositely-positioned base second distance end points of the second set of two pairs of adjacent bases located at the measured base position of the other oppositely-positioned base, and with each adjacent base second distance end point of the first set of two pairs of second distance end points located on different sides of the axis created by the first distance line, and with each adjacent base second distance end point of the second set of two pairs of second distance end points located on different sides of the axis created by the first distance line so that one adjacent base second distance end point of the first set of two pairs of second distance end points and one adjacent base second distance end point of the second set of two pairs of second distance end points are both located on the right axis side, and one adjacent base second distance end point of the first set of two pairs of second distance end points and one adjacent base second distance end point of the second set of two pairs of second distance end points are both located on the left axis side, and marking the positions where the adjacent base second distance end points on the right axis side meet and where the adjacent base second distance end points on the left axis side meet, said meeting points being the positions for marking the base positions of the two bases adjacent to the oppositely-positioned bases;

placing the bases of the infield in the positions marked for the oppositely-positioned bases and for the bases adjacent to the oppositely-positioned bases.

14. The method recited in claim 13, wherein a center reference point is located substantially halfway between the oppositely-positioned base positions, and the step of measuring the first distance includes measuring substantially half of the first distance from the center reference point to each oppositely-positioned base position.

15. The method recited in claim 14, further comprising the step of measuring substantially half of the first distance from the center reference point to the two base positions adjacent to the oppositely-situated base positions.

16. The method recited in claim 15, wherein the step of measuring substantially half of the first distance from the center reference point to each oppositely-situated base position, and the step of measuring substantially half of the first distance from the center reference point to the two base positions adjacent to the oppositely-situated base positions, include placing a center marking piece at the center reference point, and placing base marking pieces at each base position.

17. The method recited in claim 16, wherein the step of measuring substantially half of the first distance includes using an unwindable reeled cord of predetermined base-to-center length connecting each base marking piece to the center marking piece, and wherein the step of measuring the second distance includes using an unwindable reeled cord of predetermined second length connecting each base marking piece for marking the position of the oppositely-positioned bases to the base marking pieces for marking the positions of the bases adjacent to the oppositely-situated bases.

18. The method recited in claim 17, wherein the base marking pieces are configured for attaching to the center marking piece to form an integrated unit.

19. The method recited in claim 13, wherein the step of measuring the first distance includes using a reeled first cord unwindable so that the first cord extends the first distance, and wherein the step of measuring the second distances includes using reeled second cords unwindable so that the second cords extend the second distance, and wherein the reeled first cord and reeled second cords are configured to simultaneously be in unwound positions so that the first cord is extended the first distance and the second cords are each extended the second distance, and wherein the reeled first cord the reeled second cords are configured to be housed by an integrated unit.

20. The method recited in claim 19, wherein the steps of marking the base positions of the pair of oppositely-positioned bases and the bases adjacent to the oppositely-positioned bases include using base marking pieces configured to mark the positions of the pair of oppositely-situated bases and the bases adjacent to the oppositely-situated bases; wherein the reeled first cord connects the base marking pieces for marking the positions of the pair of oppositely-situated bases, and the reeled second cords connect each base marking pieces for marking the positions of the pair of oppositely-situated bases to each base marking piece for marking the positions of the bases adjacent to the oppositely-situated bases; and wherein each base marking piece is attachable, separable, and reattachable to at least one other base marking piece to form the integrated unit.

\* \* \* \* \*